United States Patent
Bhogal et al.

(10) Patent No.: US 9,141,624 B2
(45) Date of Patent: Sep. 22, 2015

(54) MANAGING THE STORAGE OF MEDIA CONTENT

(71) Applicant: International Business Machines Corporation, Armonk, NY (US)

(72) Inventors: Kulvir S. Bhogal, Fort Worth, TX (US); Rick A. Hamilton, II, Charlottesville, VA (US); Brian M. O'Connell, Cary, NC (US); Mark W. Talbot, Columbia, MD (US); Keith R. Walker, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 135 days.

(21) Appl. No.: 13/756,572

(22) Filed: Feb. 1, 2013

(65) Prior Publication Data

US 2014/0222844 A1    Aug. 7, 2014

(51) Int. Cl.
*G06F 17/30* (2006.01)

(52) U.S. Cl.
CPC .... *G06F 17/30076* (2013.01); *G06F 17/30017* (2013.01); *G06F 17/30569* (2013.01); *G06F 17/30858* (2013.01)

(58) Field of Classification Search
CPC ............... H04N 21/4126; H04N 21/44204; H04N 21/44222; H04N 21/4335; H04N 21/2343; H04N 21/262; H04N 21/4402; H04N 21/2407; H04N 21/25833; H04N 21/41407; H04N 21/4183; H04N 21/4263; H04N 21/43615; H04N 5/4403; H04N 21/47217; H04N 5/765; H04N 21/4828; H04N 21/4334; H04N 9/8042; H04N 21/47202; H04N 21/25866; H04N 21/40; H04N 21/6582; H04N 21/85406; H04N 21/4147; H04N 21/432; H04N 21/84; H04N 21/6125; H04N 21/632; H04N 17/004; H04N 21/4135; H04N 21/23106; H04N 21/23113; H04N 19/00503; H04N 21/4325; H04N 21/4622; H04N 21/231; G06F 17/30017; G06F 17/00; G06F 17/30312; G06F 1/1626; G06F 3/0484; G06F 12/00; G06F 17/30569; G06F 17/30076; G06F 17/30858; H04L 67/306; H04L 65/4084; H04L 67/22; H04L 67/28; H04L 12/282; H04L 65/60; H04L 65/601; H04L 65/4076; H04W 4/008; H04W 4/18; H04W 8/22; H04W 88/02; G11B 20/1217; G11B 2220/216; G11B 2220/2562
USPC .......... 348/14.02, 441, 552; 360/31; 386/328, 386/291, 292, 294, 295, 297; 455/557; 702/62; 707/705, 736, 756, 769, 713, 707/722, 754, 755, 757, 758, 781; 709/217, 709/231; 725/38; G9B/27.052
See application file for complete search history.

(56) References Cited

U.S. PATENT DOCUMENTS 6,184,935 B1    2/2001  Iaquinto et al.
7,365,655 B2 *  4/2008  Rao et al. .................... 341/50
(Continued)

OTHER PUBLICATIONS

Amazon.Com, Inc., "Amazon.com: Moxi3-Tuner 500GB HD Digital Recorder: Electronics" Copyright 1996-2012 Amazon.com, Inc. [online], [retrieved on Nov. 14, 2012]. Retrieved from the Internet <URL: http://www.amazon.com/Moxi-3-Tuner-500GB-Digital-Recorder/dp/B002DEMBF8/ref=sr_1_2?s=electronics&ie=UTF8 &qid=1308250578&sr=1-2>.

(Continued)

*Primary Examiner* — Hosain Alam
*Assistant Examiner* — Diedra McQuitery
(74) *Attorney, Agent, or Firm* — Maeve McCarthy

(57) ABSTRACT

A method for managing media storage. The method includes determining, by a computer, that storage space is needed on a storage device, wherein the storage device stores one or more media files. The method includes determining a likely viewing device for a media file selected from the one or more media files and converting the media file from a first format to a second format, based on the determined likely viewing device.

10 Claims, 3 Drawing Sheets

(56) References Cited

U.S. PATENT DOCUMENTS

| | | | |
|---|---|---|---|
| 7,568,079 | B2 | 7/2009 | Horiuchi et al. |
| 7,665,111 | B1 | 2/2010 | Barton et al. |
| 2003/0066084 | A1* | 4/2003 | Kaars .............................. 725/89 |
| 2003/0147631 | A1* | 8/2003 | Zimmermann ................ 386/95 |
| 2008/0141303 | A1* | 6/2008 | Walker et al. .................. 725/39 |
| 2008/0310825 | A1* | 12/2008 | Fang et al. ................... 386/124 |
| 2010/0125875 | A1 | 5/2010 | Hays et al. |
| 2011/0176787 | A1 | 7/2011 | DeCamp |

OTHER PUBLICATIONS

Aventura Technologies, Inc., "Aventura CCTV Security DVR H.264 Digital Video Recorder, Surveillance Cameras—CCTV DVR Video Surveillance" Copyright 2000-2012 Amazon.com, Inc. [online], [retrieved on Nov. 14, 2012]. Retrieved from the Internet <URL: http://www.aventuracctv.com/products/product_detail.asp?clProdID=23>.

* cited by examiner

ID OF THE INVENTION

The present invention relates generally to the field of media storage systems, and more particularly to managing the storage of media content.

BACKGROUND OF THE INVENTION

A digital video recorder (DVR) or personal video recorder (PVR) is a device that records media content, such as video, in a digital format to a disk drive or other storage medium. A user may schedule selected media content to be recorded, either to a local storage device within a DVR or PVR, or to a remote media server accessible through a communications network. In addition to scheduling a recording, the user may add the selected content to a favorites list, set a reminder for the media content, or schedule an entire series for recording. The recorded media content can then be accessed by a variety of electronic devices, such as a television or personal computer, capable of video playback, and connected to the DVR or PVR through the network.

The ease at which users can record media content often results in over-recording. For example, after missing several weeks of a recorded series, a user may have dozens of recorded, unseen episodes available on a DVR or remote media server. The user may not have time to watch all the recorded episodes or even be interested in watching them. Over time, DVRs or other media storage devices may be full, requiring users to delete previously-recorded media content before additional media content can be recorded. Many DVRs automatically delete media to make room for scheduled recordings in a manner where users have little or no control over what is deleted.

SUMMARY

Embodiments of the present invention disclose a method, computer program product, and computer system for managing media storage. The method includes determining, by a computer, that storage space is needed on a storage device, wherein the storage device stores one or more media files. The method includes determining a likely viewing device for a media file selected from the one or more media files. The method further includes converting the media file from a first format to a second format, based on the determined likely viewing device.

DETAILED DESCRIPTION

Figure 1:
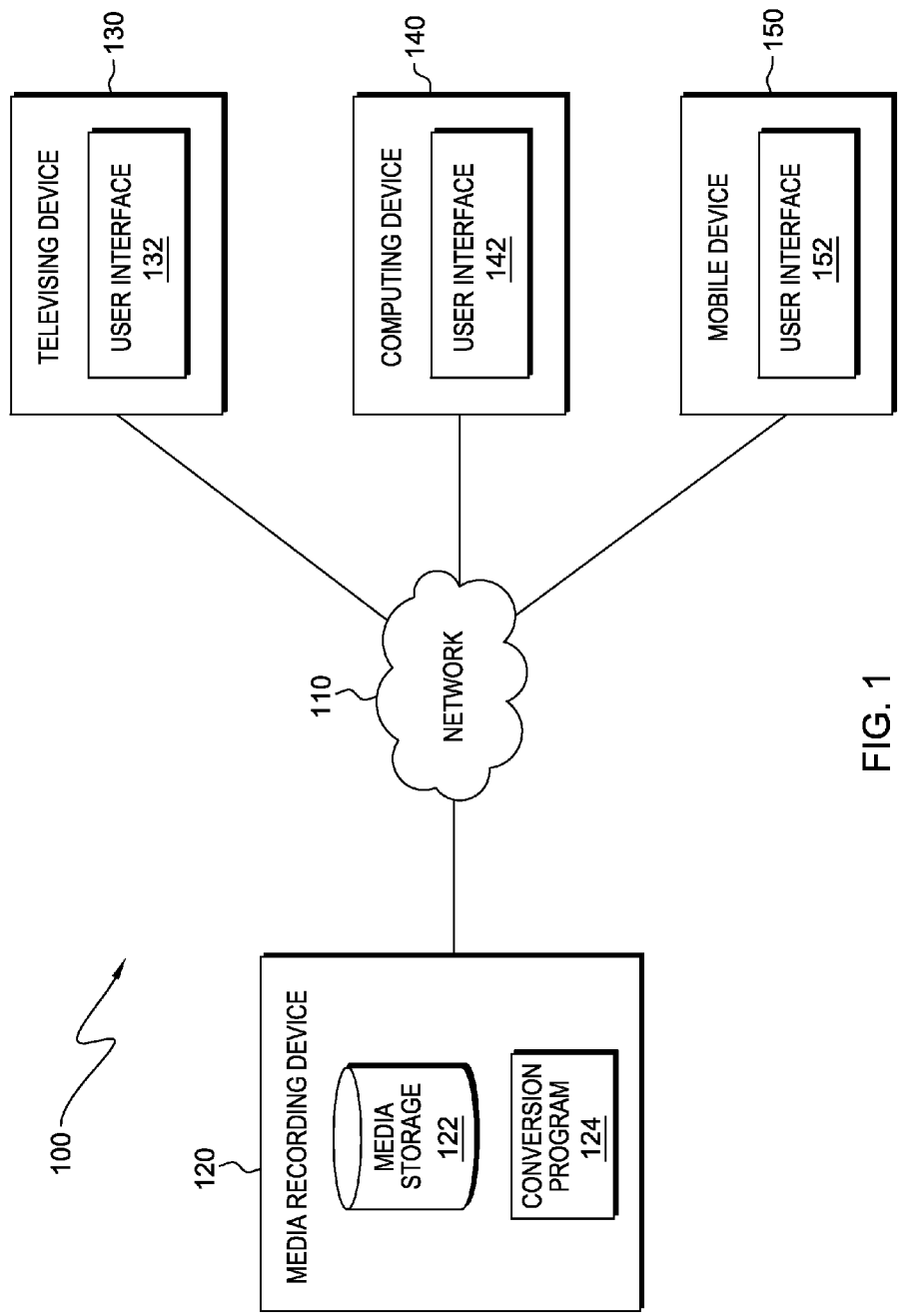
FIG. 1 is a functional block diagram illustrating a media viewing environment, in accordance with an embodiment of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable storage medium(s) having computer readable program code/instructions embodied thereon.

Any combination of computer-readable storage media may be utilized. A computer-readable storage medium may be, for example, but not limited to, an electronic, magnetic, optical, or semiconductor system, apparatus, or device, or any suitable combination of the foregoing. More specific examples (a non-exhaustive list) of a computer-readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Program code embodied may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java®, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable storage medium that can direct a computer, other programmable data processing apparatus, or other devices to function in a particular manner, such that the instructions stored in the computer-readable storage medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

The present invention will now be described in detail with reference to the Figures. FIG. 1 is a functional block diagram illustrating a media viewing environment, generally designated 100, in accordance with one embodiment of the present invention.

Media viewing environment 100 includes media recording device 120, televising device 130, computing device 140 and mobile device 150, all interconnected over network 110.

Network 110 can be, for example, a local area network (LAN), a wide area network (WAN) such as the internet, or a combination of the two, and can include wired, wireless, or fiber optic connections. In general, network 110 can be any combination of connections and protocols that will support communications between and among media recording device 120, televising device 130, computing device 140, and mobile device 150.

Media recording device 120 includes media storage 122 and conversion program 124, and is a device that can record media content in a digital format to a storage device, for example, media storage 122. In various embodiments of the present invention, media recording device 120 may be a stand-alone set-top box or a personal computer that enables media capture, storage and playback to and from the storage device. Media recording device 120 is capable of output to multiple viewing devices, such as televising device 130, computing device 140 and mobile device 150, for delivering playback. Media recording device 120 may include internal and external components as described further with respect to FIG. 3.

Media storage 122 stores media content including audio data, video data, and data-broadcasting data such as television program metadata. Metadata may include text such as title, cast, producers, directors, writers, summary, subtitles, or related media such as cover art graphics or trailer video files. Media recording device 120 includes a scheduler (not shown) that tracks all currently recorded programs and programs scheduled to be recorded. A program can be recorded if at all times between when the recording would be initiated and when it expires, sufficient space is available on media storage 122 to hold it. While in FIG. 1, media storage 122 is included in media recording device 120, one of skill in the art will appreciate that in other embodiments, media storage 122 may be located elsewhere within media viewing environment 100 and can communicate with conversion program 124 via network 110.

Conversion program 124 selects media content from media storage 122 for conversion, for example, to a lower quality file type, in order to increase available storage space in media storage 122. Conversion program 124 determines the media content for conversion based on a likely viewing device, for example, whether video data is typically viewed on a televising device or on a mobile device.

Televising device 130, computing device 140 and mobile device 150 are electronic devices capable of receiving media content from media recording device 120. Televising device 130 is capable of delivering video playback and includes an audio output device, such as a speaker (not shown), and user interface (UI) 132. UI 132 displays video data, data-broadcasting data or television video received with a television receiver from an over-the-air, satellite, or other wireless transmission antenna, or from a cable (not shown).

In various embodiments of the present invention, computing device 140 or mobile device 150 can be a laptop computer, tablet computer, netbook computer, personal computer (PC), a personal digital assistant (PDA), a smart phone, or any programmable electronic device capable of delivering video playback and communicating with media recording device via network 110. In this exemplary embodiment, computing device 140 includes user interface (UI) 142 and mobile device 150 includes user interface (UI) 152. UI 142 and UI 152 may be, for example, a graphical user interface (GUI) or a web user interface (WUI) and can display text, documents, user options, and media content, such as video data.

Figure 2:
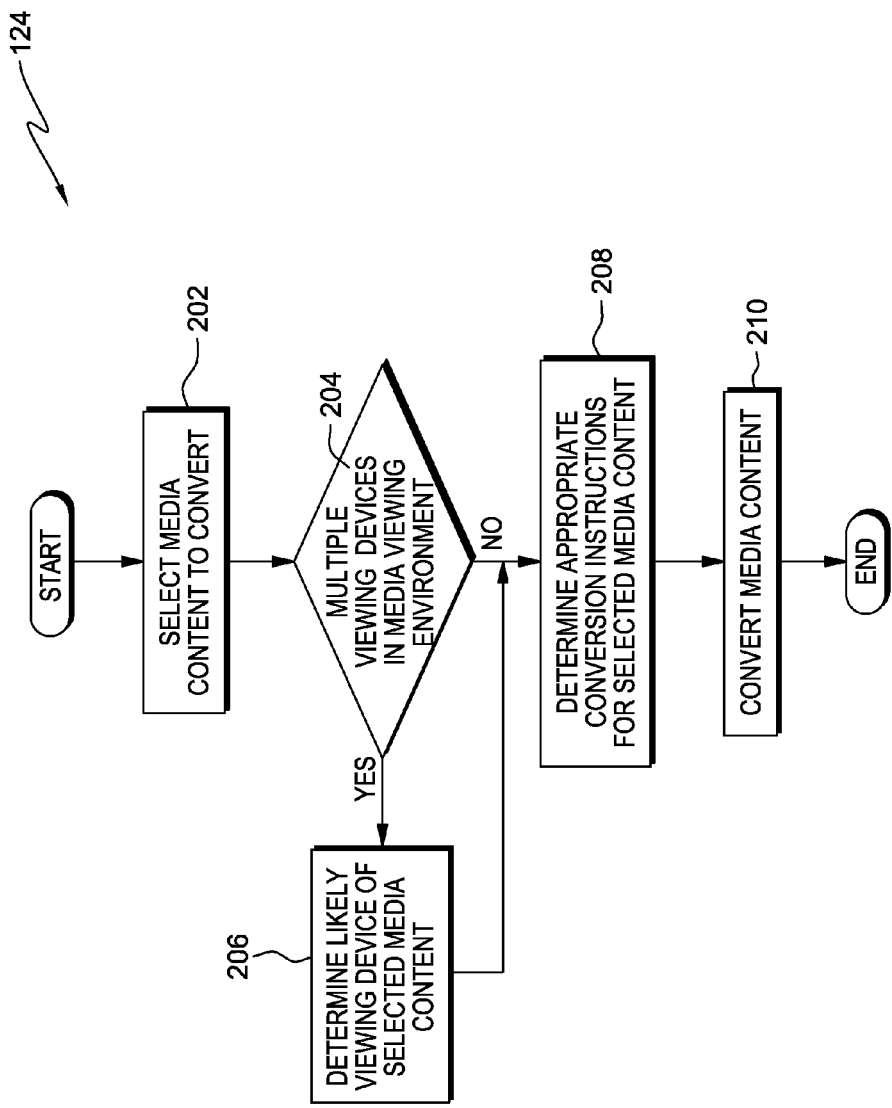
FIG. 2 is a flowchart depicting operational steps of a conversion program, for selecting and converting media content based on the viewing device of the media content, in accordance with an embodiment of the present invention.

FIG. 2 is a flowchart depicting operational steps of a conversion program, for selecting and converting media content based on the viewing device of the media content, in accordance with an embodiment of the present invention.

Conversion program 124 selects media content to convert (block 202). In various embodiments of the present invention, media content is selected for conversion based on past history, for example, which recorded media a user is least likely to watch, or based on user preferences, for example, a user may choose various recorded content to be converted if necessary. Media content may also be selected based on media genre because the viewing quality of several media genres, such as news shows or cartoons, may not be impacted by conversion to the same extent as other genres. Additionally, a user may store preferences regarding who will be viewing media content, for example, a child may not be as concerned about quality as an adult and therefore children's programs may be selected for conversion before other media content is selected. For another example, an adult who watches certain content while focused on other tasks may want to set a preference that this content may be selected for conversion before other media content is selected.

Conversion program 124 determines whether there are multiple viewing devices in the media viewing environment, for example, media viewing environment 100 (decision block 204). Conversion program 124 can detect viewing devices connected to media recording device 120. In various embodiments, viewing devices may be connected through a cable, which permits communication between media recording device 120 and the viewing device, or a user may enter properties of connected viewing devices. If there are multiple viewing devices (decision block 204, yes branch), conversion program 124 determines the likely viewing device of the selected media content (block 206). In media viewing environment 100, for example, certain shows or genres, for example, news or sports programs, may often (or always) be watched on the same viewing device. This can be determined by a viewing history kept by conversion program 124 and stored, in one embodiment, in media storage 122.

Conversion program 124 determines the appropriate conversion instructions for the selected media content based on the likely viewing device for the media content (block 208). Conversion instructions may be determined according to the visual properties of the multiple viewing devices. For example, mobile device 150 may have a lower display size and resolution than televising device 130, and therefore a higher conversion algorithm selection will not result in as noticeable a reduction in visual quality than if it were to be displayed on televising device 130. Conversion instructions may be determined according to the processing properties of the multiple viewing devices. For example, a first instance of computing device 140 may have a media player with superior processing features that can better render converted media than a different media player on a second instance of computing device 140, and therefore a higher conversion algorithm selection will not result in as noticeable a reduction in visual quality than if it were to be displayed on the second instance of computing device 140.

If there are not multiple viewing devices (decision block 204, no branch), for example, only a televising device is present, conversion program 124 determines the appropriate conversion instructions for the selected media content based on playback on the televising device (block 208).

Conversion program 124 converts the media content (block 210). Using the determined instructions, the media content is converted to a new format and the converted content is stored in media storage 122. In an exemplary embodiment, internal processes are updated to access the converted media content and the previous media content is removed from media storage 122. Also, in various embodiments, conversion program 124 may not convert media content that is currently being viewed. Additionally, conversion program 124 will not allow a user to access media content that is in the process of being converted, or will cancel a conversion if media content is accessed by a user. A user may also schedule a time for conversion program 124 to run, for example, overnight or when devices within media viewing environment 100 are not in use.

Figure 3:
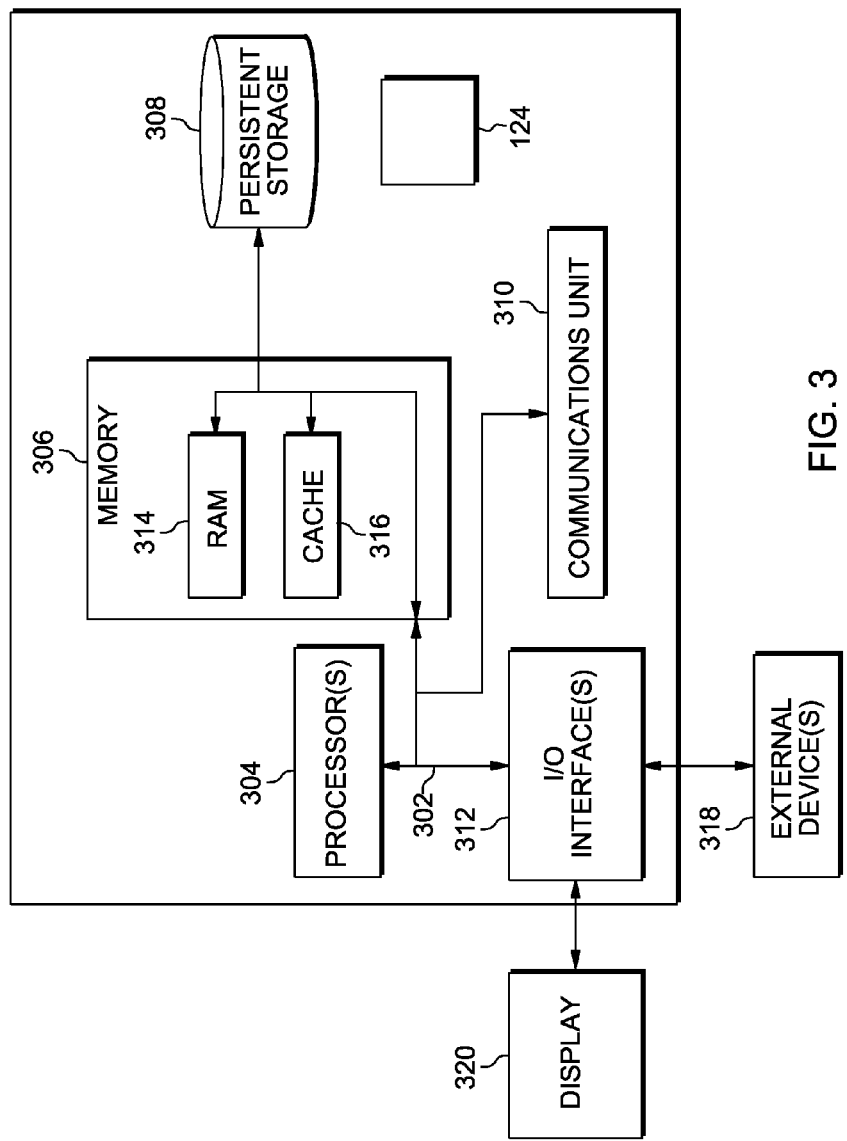
FIG. 3 depicts a block diagram of components of a media recording device, such as the media recording device of FIG. 1, in accordance with an embodiment of the present invention.

FIG. 3 depicts a block diagram of components of media recording device 120, in accordance with an illustrative embodiment of the present invention. It should be appreciated that FIG. 3 provides only an illustration of one implementation and does not imply any limitations with regard to the environments in which different embodiments may be implemented. Many modifications to the depicted environment may be made.

Media recording device 120 can include communications fabric 302, which provides communications between computer processor(s) 304, memory 306, persistent storage 308, communications unit 310, and input/output (I/O) interface(s) 312. Communications fabric 302 can be implemented with any architecture designed for passing data and/or control information between processors (such as microprocessors, communications and network processors, etc.), system memory, peripheral devices, and any other hardware components within a system. For example, communications fabric 302 can be implemented with one or more buses.

Memory 306 and persistent storage 308 are computer-readable storage media. In this embodiment, memory 306 includes random access memory (RAM) 314 and cache memory 316. In general, memory 306 can include any suitable volatile or non-volatile computer-readable storage media.

Media storage 122 and conversion program 124 on media recording device 120 can be stored in persistent storage 308 for execution and/or access by one or more of the respective computer processors 304 via one or more memories of memory 306. In this embodiment, persistent storage 308 includes a magnetic hard disk drive. Alternatively, or in addition to a magnetic hard disk drive, persistent storage 308 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 308 may also be removable. For example, a removable hard drive may be used for persistent storage 308. Other examples include optical and magnetic disks, thumb drives, and smart cards that are inserted into a drive for transfer onto another computer-readable storage medium that is also part of persistent storage 308.

Communications unit 310, in these examples, provides for communications with other data processing systems or devices, including between media recording device 120, televising device 130, computing device 140 and mobile device 150. In these examples, communications unit 310 includes one or more network interface cards. Communications unit 310 may provide communications through the use of either or both physical and wireless communications links. Media storage 122 and conversion program 124 on media recording device 120 may be downloaded to persistent storage 308 through communications unit 310.

I/O interface(s) 312 allows for input and output of data with other devices that may be connected to media recording device 120. For example, I/O interface 312 may provide a connection to external devices 318 such as a keyboard, keypad, a touch screen, and/or some other suitable input device. External devices 318 can also include portable computer-readable storage media such as, for example, thumb drives, portable optical or magnetic disks, and memory cards. Software and data used to practice embodiments of the present invention, e.g., media storage 122 and conversion program 124 on media recording device 120, can be stored on such portable computer-readable storage media and can be loaded onto persistent storage 308 via I/O interface(s) 312. In various embodiments of the present invention, I/O interface(s) 312 may also connect to a display 320. Display 320 can provide a mechanism to display data and media content to a user and may be, for example, a computer monitor or an incorporated display screen, such as is used in tablet computers and smart phones.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A non-transitory computer program product for managing media storage, the computer program product comprising:
    one or more computer-readable tangible storage media and program instructions stored on the one or more computer-readable tangible storage media, wherein the one or more computer-readable tangible storage media is hardware, the program instructions comprising:

program instructions to determine that storage space is needed on a storage device, wherein the storage device stores one or more media files;

program instructions to select a media file from the one or more media files, based, at least in part, on a scheduled time for conversion of the media file, and a user selection of a first media file including a children's program to convert before a second media file is selected, and one or more of: indicated content of the media file, a media genre, wherein a viewing quality of the media genre is not impacted by conversion to a same extent as one or more other genres, a viewing history of the media file, wherein the viewing history indicates a media file a user is least likely to watch, and one or more user preferences associated with the media file, wherein the one or more user preferences include one or more of: a user preference for a first media content to be selected for conversion before a second media content, and a user selection of a content to convert to the second format;

program instructions to determine a likely viewing device for the media file selected from the one or more media files, based, at least in part, on the viewing history of the media file, wherein the viewing history includes at least a viewing device previously used for the media file, and one or more of: a media file a user is unlikely to watch, and a viewing device on which a media genre is previously watched;

program instructions to convert the media file from a first format to the second format, based on the determined likely viewing device;

program instructions to store the converted media file in the second format;

program instructions to remove the media file in the first format from the storage device; and program instructions to update one or more internal processes to access the converted media file in the second format.

2. The computer program product of claim 1, wherein the one or more media files include one or more of: an audio file, a video file, or a data-broadcast file.

3. The computer program product of claim 1, wherein program instructions to determine the likely viewing device further comprise:

program instructions to request, from a communication network, one or more details of a viewing device, wherein such details include one or more of: a display resolution, a display size, and a processing property of the viewing device; and program instructions to determine the likely viewing device based on at least one of the one or more details of the viewing device.

4. The computer program product of claim 1, wherein the determined likely viewing device includes one or more of: a televising device, a personal computing device and a mobile computing device.

5. The computer program product of claim 1, wherein the second format is a lower quality digital format than the first format.

6. A computer system for managing media storage, the computer system comprising:

one or more computer processors;
one or more computer-readable tangible storage media;

program instructions stored on the one or more computer-readable tangible storage media for execution by at least one of the one or more computer processors, the program instructions comprising:

program instructions to determine that storage space is needed on a storage device, wherein the storage device stores one or more media files;

program instructions to select a media file from the one or more media files, based, at least in part, on a scheduled time for conversion of the media file, and a user selection of a first media file including a children's program to convert before a second media file is selected, and one or more of: indicated content of the media file, a media genre, wherein a viewing quality of the media genre is not impacted by conversion to a same extent as one or more other genres, a viewing history of the media file, wherein the viewing history indicates a media file a user is least likely to watch, and one or more user preferences associated with the media file, wherein the one or more user preferences include one or more of: a user preference for a first media content to be selected for conversion before a second media content, and a user selection of a content to convert to the second format;

program instructions to determine a likely viewing device for the media file selected from the one or more media files, based, at least in part, on the viewing history of the media file, wherein the viewing history includes at least a viewing device previously used for the media file, and one or more of: a media file a user is unlikely to watch, and a viewing device on which a media genre is previously watched;

program instructions to convert the media file from a first format to the second format, based on the determined likely viewing device;

program instructions to store the converted media file in the second format;

program instructions to remove the media file in the first format from the storage device; and program instructions to update one or more internal processes to access the converted media file in the second format.

7. The computer system of claim 6, wherein the one or more media files include one or more of: an audio file, a video file, or a data-broadcast file.

8. The computer system of claim 6, wherein program instructions to determine the likely viewing device further comprise:

program instructions to request, from a communication network, one or more details of a viewing device, wherein such details include one or more of: a display resolution, a display size, and a processing property of the viewing device; and program instructions to determine the likely viewing device based on at least one of the one or more details of a viewing device.

9. The computer system of claim 6, wherein the determined likely viewing device includes one or more of: a televising device, a personal computing device and a mobile computing device.

10. The computer system of claim 6, wherein the second format is a lower quality digital format than the first format.

* * * * *